United States Patent [19]
Takemura et al.

[11] Patent Number: 5,162,922
[45] Date of Patent: Nov. 10, 1992

[54] APPARATUS FOR MULTI-CHANNEL DIVIDING, RECORDING AND REPRODUCING A VIDEO SIGNAL

[75] Inventors: Yoshinari Takemura, Settsu; Shigeru Furumiya, Katano; Hiromu Kitaura, Osakasayama, all of Japan

[73] Assignee: Matsushita Electric Industrial Co., Ltd., Osaka, Japan

[21] Appl. No.: 596,329

[22] Filed: Oct. 15, 1990

[30] Foreign Application Priority Data

Oct. 16, 1989 [JP] Japan .................. 1-274051

[51] Int. Cl.$^5$ .............................................. H04N 5/76
[52] U.S. Cl. ...................... 358/342; 358/335; 360/22
[58] Field of Search .............. 358/342, 310, 335, 322, 358/330, 339, 347; 369/48, 49, 50, 100, 109, 110, 111; 360/22, 23, 3301, 3501; 309/124

[56] References Cited

U.S. PATENT DOCUMENTS

| | | | |
|---|---|---|---|
| 4,298,974 | 11/1981 | Tsunoda et al. | 369/111 |
| 4,449,212 | 5/1984 | Reno | 369/112 |
| 4,546,463 | 10/1985 | Opheij et al. | 369/110 |
| 4,819,086 | 4/1989 | Hayashi et al. | 358/330 |
| 4,864,428 | 9/1989 | Kanamaru | 358/342 |
| 4,873,582 | 10/1989 | Furuhata et al. | 358/310 |
| 4,939,586 | 7/1990 | Nabati et al. | 358/342 |

Primary Examiner—Dale M. Shaw
Assistant Examiner—Thai Tran
Attorney, Agent, or Firm—Wenderoth, Lind & Ponack

[57] ABSTRACT

A video disc is produced from a master video disc which has recorded therein a video signal including a synchronous signals occurring periodically and divided into plural channels by the cycle of the synchronous signals. The plural channel signals are recorded on a group of plural tracks, respectively. In the case of reproducing the video disc, the plural channel signals are reproduced from the group of plural tracks, respectively. Synchronous signals are detected from the reproduced signals. The reproduced channel signals in a period of the synchronous signal are stored in plural memories based on the synchronous signals detected. The stored plural channel signals are continuously reproduced by successively reading from the memories of channels by switching at synchronous intervals. The signal bandwidth of the channels becomes 1/n of the original video signal by recording and reproducing the video signal by dividing it into plural channels(n channels) in such manner. Therefore, even when the shortest recording wavelength is the same, the linear velocity is reduced by 1/n.

9 Claims, 5 Drawing Sheets

FIG. 3

| LINE NUMBER | | SAMPLE NUMBER | | |
|---|---|---|---|---|
| | 1  12 | 13      106 | 107 | 480 |
| 1 | | FRAME PULSE #1 | | |
| 2 | | FRAME PULSE #2 | | |
| 3 | HD PERIOD | AUDIO / ADDITIONAL DATA | | |
| 43 | | C SIGNAL | | |
| 47 | | | Y SIGNAL (516 LINES) | |
| 559 | | CONTROL SIGNALS | | |
| 563 | | | CLAMP LEVEL | |
| 564 | | EMPTY | | |
| 565 | | AUDIO / ADDITIONAL DATA | | |
| 605 | | C SIGNAL | | |
| 609 | | | Y SIGNAL | |
| 1121 | | CONTROL SIGNALS | | |
| 1125 | | | CLAMP LEVEL | |

APPARATUS FOR MULTI-CHANNEL DIVIDING, RECORDING AND REPRODUCING A VIDEO SIGNAL

BACKGROUND OF THE INVENTION

1. Field of the Invention

This invention relates to a video recording and reproducing apparatus in which image signals are divided into plural channels and recorded and reproduced.

2. Description of the Prior Art

A high-definition television system (Hi-Vision) has been proposed recently, which can display a wider image at higher resolution in comparison with existing television systems. The high-definition television system has 5 or more times the data volume as compared with the conventional television system. So when the data is recorded in a conventional video disc, the available recording time is much shorter. On the other hand, the MUSE, (Multiple Sub-Nyquist Sampling Encoding) system developed by NHK, (Nihon Hoso Kyokai, or the Japanese Broadcasting Corporation), can broadcast the high-definition television signals through one of the satellite broadcasting channels by band-compressing the signals (Ninomiya, et al.: Development of the MUSE System, NHK Technical Study Report Vol. 39-2). By using the MUSE signals in which the high-definition television signals are band-compressed, longer recording times of the video disc can be obtained. When the high-definition television data is band-compressed, it becomes an analog signal having an of 8.1 MHz signal bandwidth. The bandwidth of MUSE signals is approximately two times that of the existing television signals. Therefore, when the same shortest recording wavelength as in a video disc in which existing television signals are recorded, the linear velocity required in recording and reproducing approximately doubles. To cope with this, the innermost circumferential radius should be enlarged, or the rotating speed of disc should be higher. If the innermost circumferential radius is enlarged, the available recording time of the disc becomes shorter. If the rotating speed of the disc is increased, the motor which rotates the disc must bear a heavier load. A laser beam in an optical video disc is controlled to focus along the track of the disc during recording and producing. When the rotating speed becomes higher, the bandwidth of the controlling system must be wider, and the control tends to be unstable.

In addition, by dividing, the MUSE signal into plural channels and recording them in parallel, the linear velocity can be reduced. In the channel-division recording system, division points and composition points of video signals must be matched. Therefore, the video signals must be synchronized during recording and reproducing. In recording, the synchronization is possible by using the input MUSE signals, but in reproducing, the reproduction signals must be used for the synchronization. Synchronous signals are conventionally newly added for the synchronization in image reproduction. For this purpose, a part of the video signals are replaced with synchronous signals, or the time axis of the video signals is compressed to insert synchronous signals. In the case of substituting with synchronous signals, some of the video signals are lost. When the video signals are time-compressed, on the other hand, to insert synchronous signals, the signal bandwidth must be wider.

In the channel-division recording system, since the video signals are time-expanded or time-compressed, it is necessary to convert the video signals into digital signals once and store them in a memory. As the MUSE signals transmit sample values in an analog system, however, it is necessary to strictly match sampling phases in the case of sampling at the same frequency. A synchronous signal that can detect a phase error is required to, match the sampling phases, and the processing circuit becomes complicated. In addition, although the sampling phases do not have to be matched when the sampling is performed at higher frequency than the sampling frequency of the MUSE signals, a larger volume of data must be stored in a memory.

SUMMARY OF THE INVENTION

This invention was devised in the light of the problems as stated herein, and it is hence a primary object of the invention to present a video disc and a recording and reproducing apparatus that records video signals by dividing them into plural channels and allows easy processing of signals in composition of the channels upon reproduction.

In order to attain the above object, a video disc recording apparatus of the invention comprises: a synchronization detection circuit for detecting synchronization signals from a video signal; a switching signal generating circuit for generating a channel-switching signal indicating a channel division point at intervals of the detected synchronous signal detected; a memory for storing the video signal; and a memory control circuit for reading the video signal from the memory based on the channel-switching signal by dividing the video signal in each synchronous cycle into plural channels at each channel division point, and a means for recording the plural channel signals respectively on a group of tracks of an optical disc, the number of tracks being the same as the number of channels and the recording being effected by irradiating the group of tracks with light beams which are respectively modulated by the plural channel signals.

The recorded optical disc may be used either as a video disc for reproduction use or as a master disc for producing a video disc for reproduction use in a conventional process.

A video disc reproducing apparatus of the invention comprises: an optical detector for radiating light beams onto the group of plural tracks on the video disc and for detecting reflected light beams from the tracks to obtain the plural channel signals; a synchronization detection circuit for detecting synchronous signals from the reproduced plural channel signals; plural channel memories for respectively storing the reproduced plural channel signals each in one synchronous period based on the detect synchronous signals; and a memory control circuit for controlling the channel memories to read from the memories the channel signals in turn by switching at channel composition points corresponding to the channel division points so as to thereby reproduce the plural channel signals continuously.

The signal bandwidth of each channel becomes 1/n of the original signal when recording the video signal by dividing it into plural channels (n channels) and reproducing them in the above manner. Therefore, even when the shortest recording wavelength is the same, the linear velocity becomes 1/n.

Moreover, in the case of using the MUSE signal as the video signal where a Hi-Vision signal is band-compressed by the MUSE system, the synchronous signal is completed in one frame. When two adjacent frames of the MUSE signal are separated into two channels by the method of the invention, the format of the synchronous signal in each channel is the same as that of the MUSE signal. Thus, the synchronization detection process can also be the same as that of the MUSE signal, and it becomes easier to precisely match the sampling phases. In addition, since the same circuit as the MUSE decoder can be used in the synchronization detection circuit, when sharable ICs are produced, cost reduction is also possible.

The signal bandwidth of each channel is one half that of the original signal when recording the MUSE signal by dividing it into two channels. Therefore, the linear velocity can be cut in a half even when the shortest recording wavelength is the same.

BRIEF DESCRIPTION OF THE DRAWINGS

FIG. 3 is an explanatory drawing of a transmission format of the MUSE signal;

DETAILED DESCRIPTION OF THE PREFERRED EMBODIMENTS

An embodiment of the invention is described in detail below.

Figure 4:
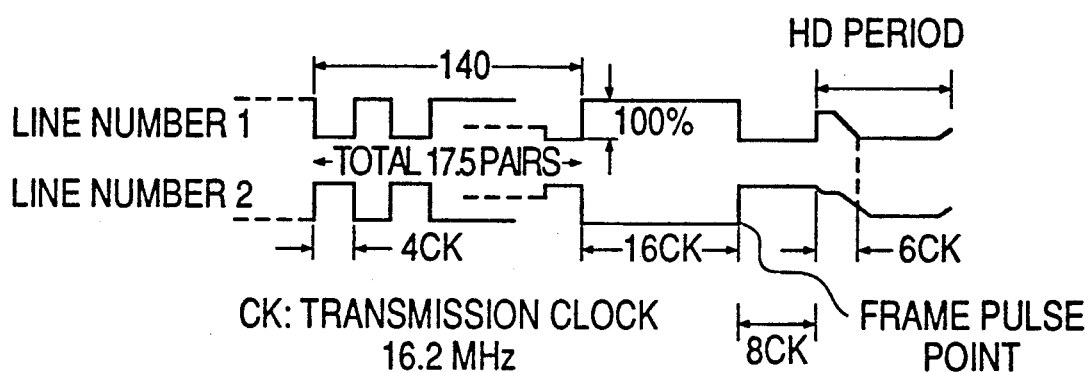
FIG. 4 is a model chart of frame pulse waveform.
Figure 5:
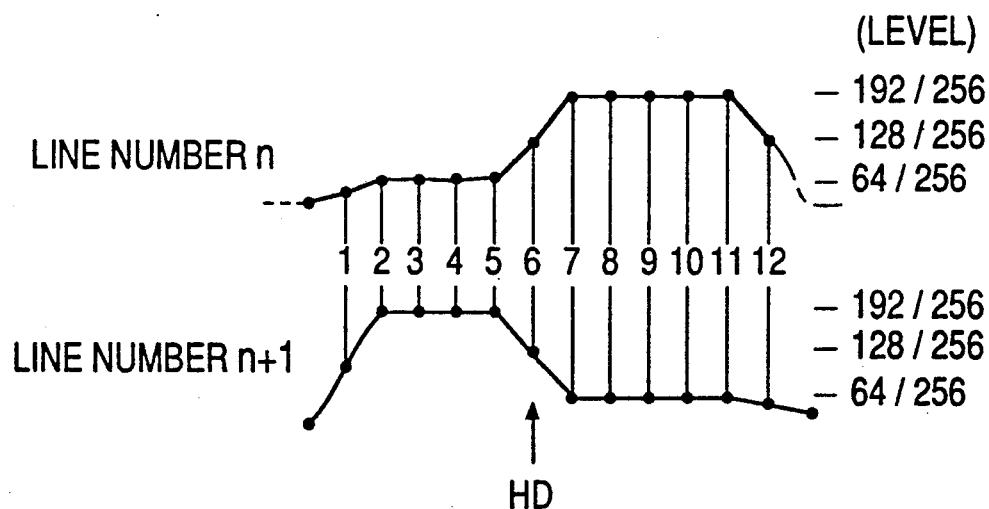
FIG. 5 is a model chart of the HD waveform.

The MUSE signal, used as a video signal in the embodiment, is divided into two channels and recorded in two tracks, and the invention is described taking this case. Of many technologies used in the MUSE system, there is a system that sub-samples Hi-Vision signals which are supplemented in movement in multiplex and analog-transmits sample values. In such a transmission of sample values, precise resampling timing is required in decoding. Synchronous signals used for detecting phase errors are added to match sampling phases. FIG. 3 shows the transmission format of the MUSE signal. One line of the MUSE signal is sampled at 480 points. Supposing that the samples are numbered from 1 to 480, 12, 94 and 374 samples are respectively allotted to HD, C and Y. There are lines numbered from 1 to 1125 in the vertical direction where frame pulses are multiplexed in lines 1 and 2. Synchronization is reproduced by using the frame pulse and HD in the MUSE system. FIG. 4 shows the waveform of the frame pulse. The waveform of the frame pulse is reversed at line intervals, and it is detected from correlation of the lines. The position where the HD waveform is inserted is obtained from the position of the frame pulse. FIG. 5 shows the HD waveform. The HD waveform which is reversed at intervals of 1 H (H=horizontal synchronizing period) and rises or falls at sample 6 has a level of 128/256. The line reversal, however, is reset by frame so that the HD in line 3 falls. Then, based on this point the average value of the sum of samples 4 and 8 is obtained to determine the difference between the average value and the value of sample 6. This value is the phase error in 1 H. Resampling timing can be adjusted by changing the phase of the clock in such manner that the phase error becomes equal to zero. Synchronous signals of frame synchronization and line synchronization are repeated at frame intervals.

The amplitude range of the synchronous signal of the MUSE system is the same as that of the video signal. So, when the rotating speed of the disc differs significantly, it is difficult to reproduce the synchronous signal. Therefore, in recording media such as video discs, a pilot signal of a specified frequency is frequency-multiplexed in recording, and the rotation of the disc is controlled in such a manner that the frequency of the pilot signal comes to be the specified frequency in playback.

Figure 1:
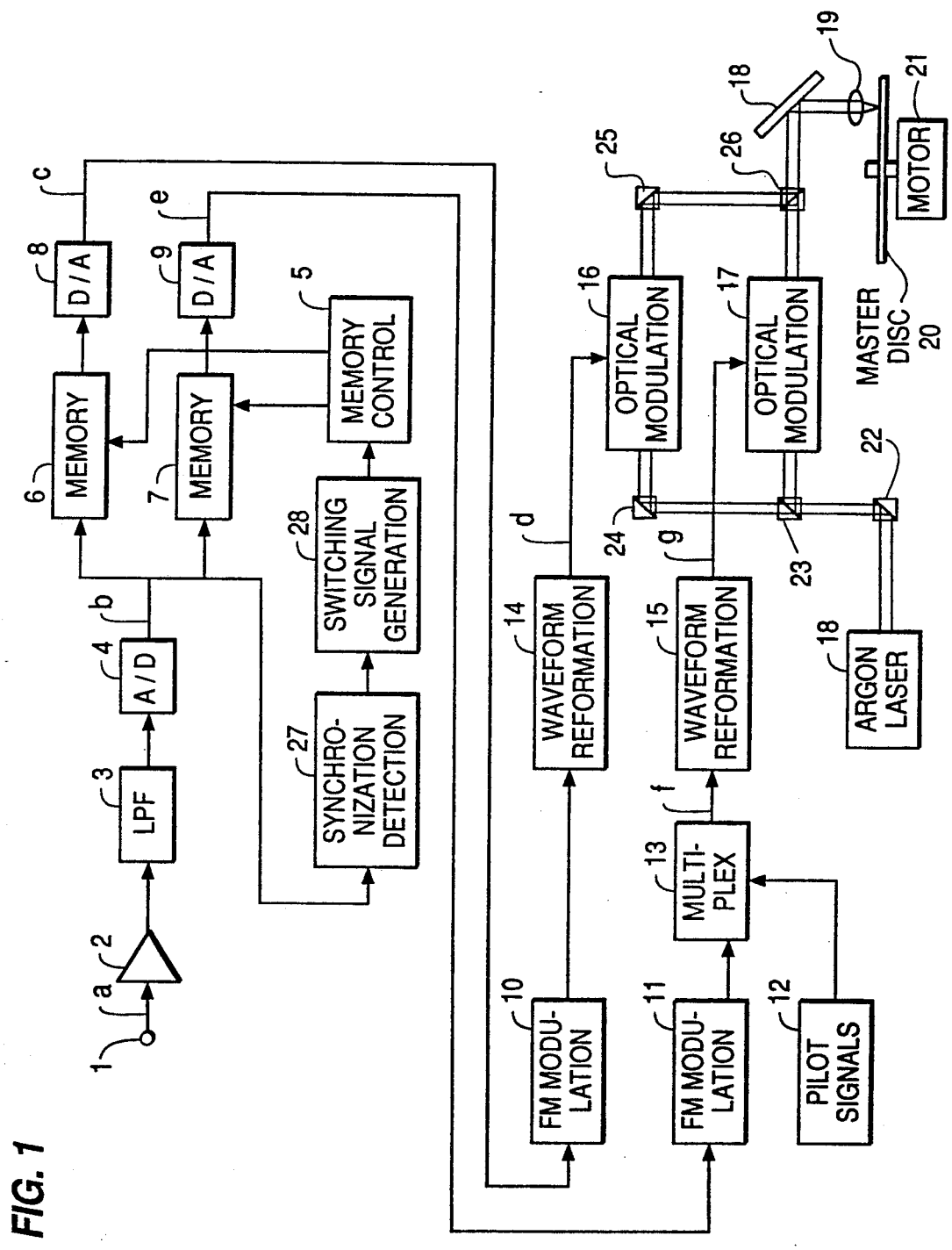
FIG. 1 is a block structural diagram of a disc recording apparatus in an embodiment of the invention.

An embodiment of a recording apparatus that records the MUSE signal on a video disc is described below. FIG. 1 is a block diagram showing the structure of a disc recording apparatus of the embodiment. Element 1 of FIG. 1 is an input terminal; element 5 is a memory control circuit; element 12 is a pilot signal generating circuit elements 16 and 17 are optical modulators; element 20 is an optical disc; element 27 is a synchronization detection circuit, and element 28 is a switching signal generating circuit.

A high definition television signal is band-compressed by a MUSE encoder, converted into a MUSE signal and applied to the input terminal 1. The inputted MUSE signal a is amplified by an amplifier 2 and converted into a digital MUSE signal b by an A/D converter 4 after its undesired components have been removed by a low pass filter 3. The synchronization detection circuit 27 detects a frame synchronous signal and a line synchronous signal from the digital MUSE signal b. The switching signal generating circuit 28 generates from the synchronous signals a channel switching signal showing a channel division point at frame intervals. The memory control circuit 5 divides the MUSE signal b into two channels on a frame by frame basis at the channel division points based on the channel switching signal and writes them in succession by switching to memories 6 and 7. Each of the memories 6 and 7 is a frame memory that can store data of the MUSE signal in one frame. Each of the two memories writes the data of pixels in one frame transmitted according to the control signals from the memory control circuit 5, while it reads the data of pixels by expanding the time to double at a half of the frequency in writing. A D/A converter 8 converts the data read from the memory 6 to an analog MUSE signal c. The MUSE signal c which has been time-expanded is modulated by an FM modulator 10, converted to a rectangular waveform by a waveform reforming circuit 14 and inputted to an optical modulator 16 as a recording signal d. A D/A converter 9 converts the data read from the memory 7 to an analog MUSE signal e in the same manner. The MUSE signal e which has been time-expanded is modulated by an FM modulator 11 and applied to a multiplex circuit 13. The multiplex circuit 13 frequency-multiplexes a pilot signal generated by a pilot signal generating circuit 12 to the FM modulated wave to obtain a multiplexed signal f. The signal f is converted to a rectangular waveform by a waveform reforming circuit 15 and inputted to an optical modulator 17 as a recording signal g. A laser beam emitted by an argon laser 18 is divided into two laser beams by optical parts 22, 23 and 24, and they pass through optical modulators 16 and 17, respectively. The optical modulators 16 and 17 modulate the strength of the laser beams in accordance with recording signals d and g, respectively. Optical parts 25 and 26 compose the laser beams passed through the optical modulators in one laser beam. A mirror 18 and an objective lens 19 control the composed laser beam to focus on a specified position on the optical disc 20. Thus, two spots are formed on the disc 20 by the laser beams modulated by the optical modulators 16 and 17, respectively. A motor 21 rotates the disc 20 and records two tracks by means of the two spots.

The thus recorded optical disc 20 may be used either as a video disc for playback use or as a master disc for producing a number of video discs for playback use in a well-known conventional production process.

Next is an explanation of an apparatus which can play a video disc recorded with MUSE signal as described above.

Figure 2:
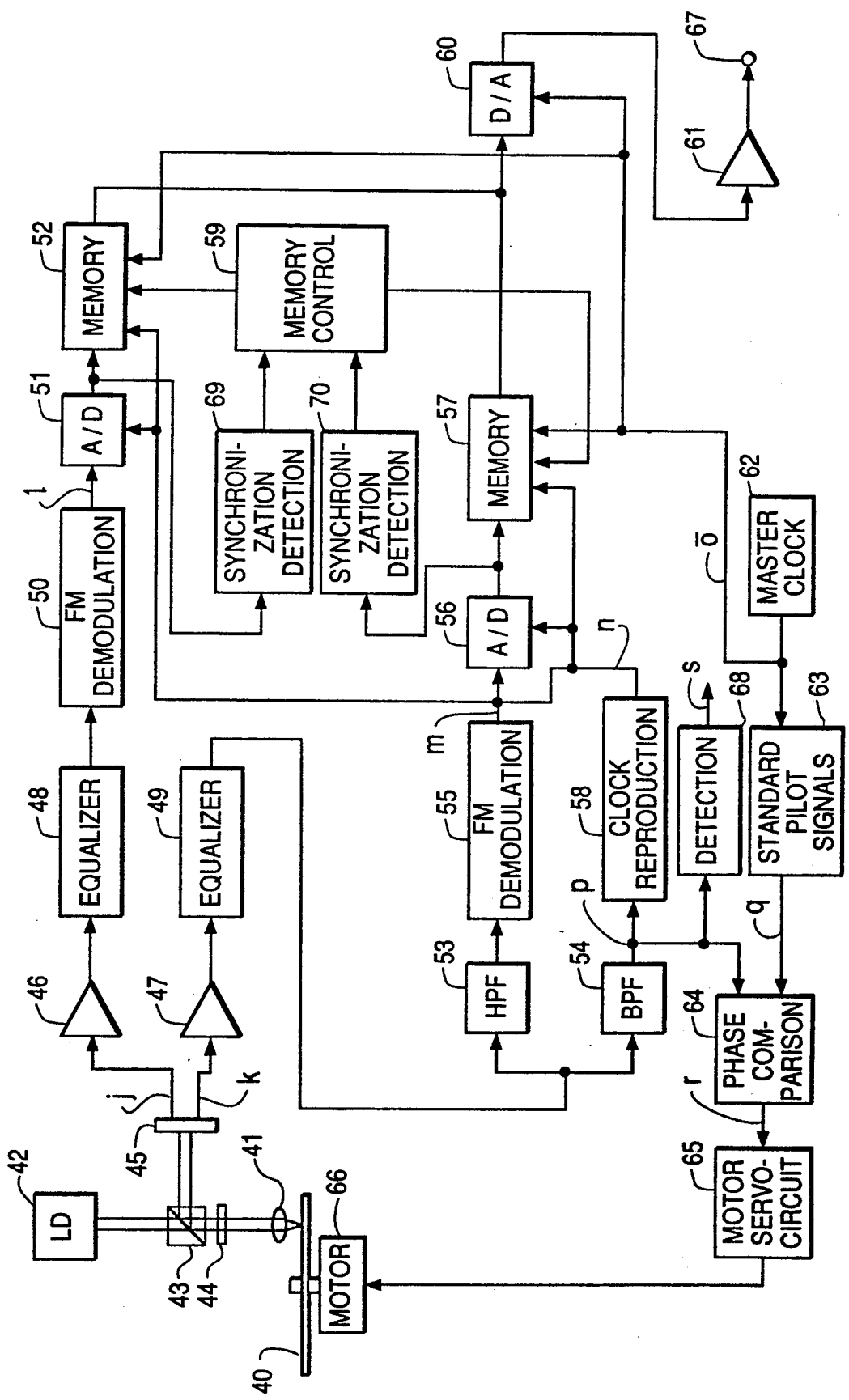
FIG. 2 is a block structural diagram of a disc reproducing apparatus in an embodiment of the invention.

FIG. 2 is a block diagram showing a structure of a disc reproducing apparatus of an embodiment. In FIG. 2, element 40 is a video disc; element 42 is a semiconductor laser (laser diode) element 45 is an optical detector, 54 is a band-pass filter element 58 is a clock reproducing circuit elements 52 and 57 are memories element 59 is a memory control circuit elements 69 and 70 are synchronization detection circuits element 64 is a phase comparison circuit; and element 65 is a motor servo-circuit.

The video disc 40 is rotated by a motor 66. The semiconductor laser 42 emits two laser beams for reproduction. The laser beams for reproduction are focused on the disc by an objective lens 41. The objective lens 41 controls spots of the reproductive laser beams to be placed on the respective tracks. Optical parts 43 and 44 separate a laser beam radiated from the semiconductor laser 42 from a laser beam reflected by the disc, and enter the reflected beam into the optical detector 45. The optical detector 45 receives the reflected beams from two tracks, electrooptically converts them to signals j and k and outputs the signals to pre-amplifiers 46 and 47. Signal j reproduced from a track which does not include the pilot signal is amplified by the pre-amplifier 46, equalized by an equalizer 48 and demodulated by an FM demodulator 50 into a MUSE signal 1. Signal k reproduced from a track in which the pilot signal is multiplexed is amplified by the preamplifier 47, equalized by an equalizer 49 in the same manner, and applied to both a high-pass filter 53 and a band-pass filter 54. Of the FM modulated signal and pilot signal which are multiplexed in the signal k, the FM modulated signal is extracted by the high-pass filter 53, and the pilot signal p by the band-pass filter 54. The FM modulated signal extracted is demodulated by an FM demodulator 55 into a MUSE signal m. The clock reproducing circuit 58 generates a clock n corresponding to pixels of the MUSE signal which are time-expanded from the pilot signal p extracted. An A/D converter 51 converts the demodulated MUSE signal 1 by the clock n into a digital MUSE signal, which is then written into the memory 52. The synchronization detection circuit 69 detects the frame synchronous signal and line synchronous signal from the MUSE signal 1 and transmits timing signals based on them to the memory control circuit 59. An A/D converter 56 converts the demodulated MUSE signal m by the clock n into another digital MUSE signal, which is then written into the memory 57. The synchronization detection circuit 70 detects the frame synchronous signal and line synchronous signal from the MUSE signal m and transmits timing signals based on them to the memory control circuit 59. A master clock generating circuit 62 generates a clock o corresponding to pixels of the original MUSE signal. The memory control circuit 59 controls the memories 52 and 57 so that the MUSE signals reproduced based on synchronous signals which are detected from the respective channels are written in the memories 52 and 57 on a frame by frame basis. Further, the memory control circuit 59 controls the memories 52 and 57 such that the data are read in succession according to the clock o from memories of respective of channels by switching the memories at channel composing point corresponding to channel division point, thereby to reproduce continuous MUSE signals. A D/A converter 60 converts the data of the read MUSE signals to an analog MUSE signal, which is then amplified by an amplifier 61 and outputted from an output terminal 67.

The MUSE signals outputted will be processed by a known MUSE decoder to reproduce a Hi-Vision signal. A standard pilot signal generating circuit 63 generates from the clock o a pilot signal q which is synchronized with the clock o. The phase comparison circuit 64 compares the phase of the pilot signal q and the reproduced pilot signal p, and generates a phase error signal r. The motor servo-circuit 65 controls the rotating speed of the motor 66 to avoid accumulation of the phase error signal r.

Since the MUSE signal is divided into two channels on a frame by frame basis based on the channel switching signal which indicates the channel division points in the embodiment as described hereinabove, the formats of the synchronous signals of the channels are the same as that of the MUSE signal,,and thus the detection of synchronization in playback is the same as that of the MUSE signal, and precise matching of sampling phases is easily performed.

Figure 6:
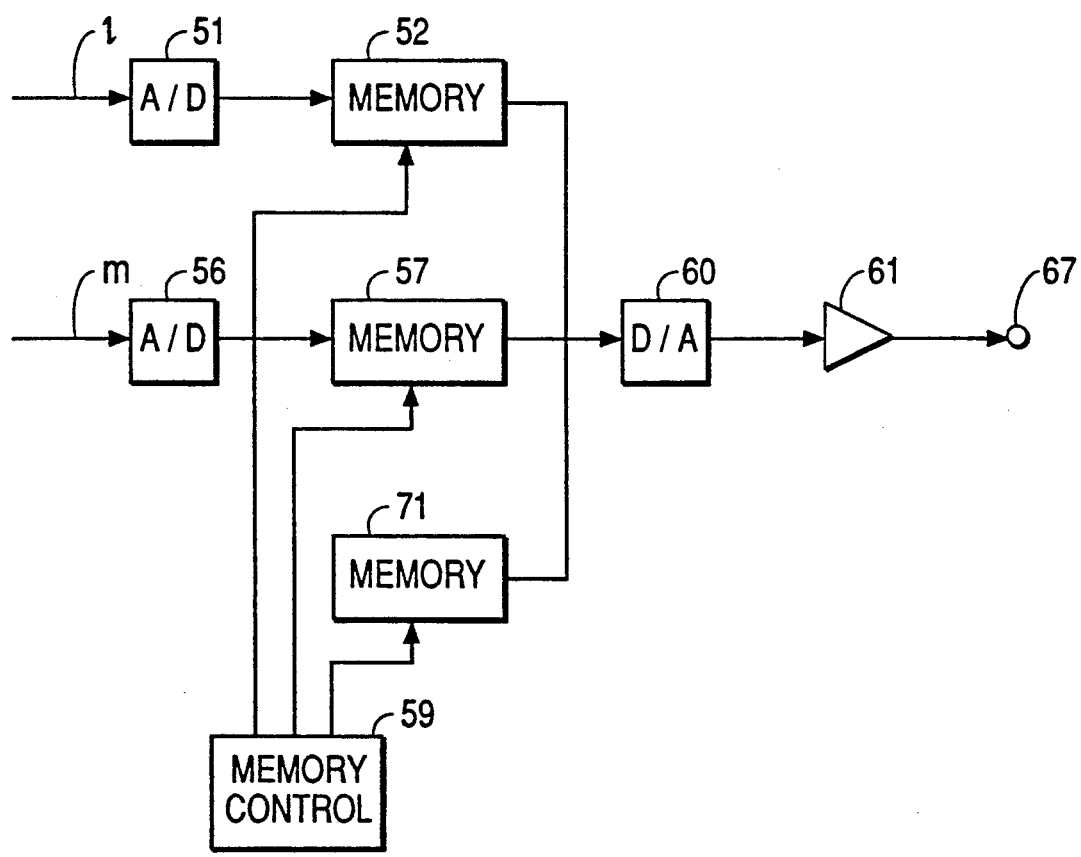
FIG. 6 is a block structural diagram of a memory part of a disc reproducing apparatus in accordance with an embodiment of the present invention.

To search a desired scene recorded in a video disc, a signal in a new track is reproduced by jumping tracks. Sub-sample phases are selected at intervals of two frames in the MUSE system. Therefore, the sample phase of each field is recorded in the control signal shown in FIG. 3. In order to obtain continuous sub-sample phases of MUSE signal even in the case of track jumping, it is necessary to reproduce the control signal in the disc reproducing apparatus and detect the sample phases. In addition, since the control signal is placed in one field before, the control signal in the first field can not be reproduced. However, since reproductive laser beams are radiated to two tracks for the reproduction of signals in the embodiment, frames reproduced in each channel can be predetermined. Therefore, when it is designated that the reproduction always starts from a fixed one of the channels, sub-sample phases of the reproduced signals come to be continuous. An embodiment of this case is shown in FIG. 6. Since the structure except the memory part is the same as that of the reproducing apparatus shown in FIG. 2, it is not shown in FIG. 6 again.

The MUSE signal 1 reproduced is written in the memory 52 in the same manner as described in regard to FIG. 2, and the MUSE signal m is written in the memory 57. When the MUSE signal 1 is of the first frame, for example, the MUSE signal m is of the second frame. The order should be designated in recording. Even in the case of track jumping, since the reproduction starts always from the MUSE signal 1, the sub-sample phase of the first field is always the same. The control signal of the field is previously designated. Data, except for the sub-sample phase, may be set as if without movement because there is no correlation with previous frame. The control signal is written in a memory 71. In the case of track jumping, for example, the memory control circuit 59 repeatedly reproduces the data in the memories 52 and 57 until a new signal is reproduced. When a new reproduced signal is written in the memories 52 and 57, the control signal in the memory 71 is read corresponding with the position of control signal in the final field which is in reproduction. Continuous subsample phases are obtained by continuously reading signals in new fields.

Moreover, since signals of two channels are reproduced by simultaneously radiating reproductive laser beams to the respective tracks in the embodiment, variations in time which occur in the two channels are nearly equal to each other. Therefore, by writing the reproduced signals of the two channels demodulated into the two channel memories using a clock reproduced from the pilot signal which is multiplexed and recorded in one of the channels, and reading them from the channel memories by a fixed clock, the MUSE signal which has been time-expanded and recorded is time-compressed to convert it into the original MUSE signal as well as removing the time-base error (jitter) included in the playback signals. A normal time-base error can be removed by controlling the rotating speed of the motor in such manner that the phase error signal of the pilot signal is reduced.

Although MUSE signals divided into two channels are recorded on one side of disc by using two tracks in the embodiment, this invention may be applied regardless of the format on a disc.

What is claimed is:

1. A signal recording apparatus for recording a video signal containing a periodically occurring combination of vertical and horizontal synchronous signals, comprising:
   a synchronization detection circuit for detecting the synchronous signals from the video signal;
   a switching signal generating circuit responsive to the synchronous signals for generating a channel switching signal indicating channel division points at intervals of the periodic occurrence of the combination of vertical and horizontal synchronous signals;
   plural memories for storing the video signal;
   a memory control circuit responsive to the channel switching signal for controlling the plural memories for dividing the video signal at the channel division points into plural channel signals each containing the periodically occurring combination of vertical and horizontal synchronous signals and for storing the plural channel signals in the plural memories, respectively, and for controlling the plural memories to read the plural channel signals from the plural memories; and
   a means for recording the plural channel signals read from the plural memories on a group of plural tracks of a recording medium, respectively.

2. A video disk recording apparatus for recording a MUSE signal which is a high definition signal band-compressed by the MUSE system on a recording disc, comprising:
   a synchronization detection circuit for detecting a frame synchronous signal and a line synchronous signal from the MUSE signal;
   a switching signal generating circuit responsive to the synchronous signals for generating a channel switching signal indicating channel division points at frame intervals of the synchronous signal detected;
   two memories for storing the MUSE signal;
   a memory control circuit responsive to the channel switching signal for controlling the two memories for dividing the MUSE signal at the channel division points into two channel signals each containing the frame synchronous signal and the line synchronous signal and for storing the two channel signals in the two memories, respectively, and for controlling the two memories to read the two channel signals from the two memories; and
   a means for recording the two channel signals read from the two memories on two tracks of a recording disc, respectively.

3. A signal reproducing apparatus for playing back a recording medium in which plural channel signals of a video signal each including a synchronous signal occurring periodically are recorded on a group of plural tracks, respectively, comprising:
   an optical detection unit including a laser beam source for radiating reproductive laser beams to the group of plural tracks, respectively, and an optical detector for detecting light reflected from the tracks to obtain the plural channel signals;
   a synchronization detection circuit for detecting synchronous signals from the plural channel signals;
   plural channel memories for storing the plural channel signals, respectively, in response to the synchronous signals detected; and
   a memory control circuit for controlling the channel memories to successively read from the memories the plural channel signals in turn by switching at channel composing points which correspond to channel division points to continuously reproduce the plural channel signals in a sequence to form the video signal.

4. A video disc reproducing apparatus for playing back a video disc in which two channel signals of a MUSE signal are recoded on two tracks, respectively, comprising:
   an optical detection unit including a laser beam source for radiating two reproductive laser beams to the two tracks and an optical detector for detecting light reflected from the tracks to obtain the two channel signals;
   a synchronization detection circuit for detecting frame synchronous signals and line synchronous signals from the reproduced two channel signals;
   two channel memories for storing the reproduced two channel signals, respectively base on the synchronous signals detected; and
   a memory control circuit for controlling the channel memories to successively read from the memories the two channel signals by switching at channel composing points which correspond to channel division points to continuously reproduce the MUSE signal divided on a frame by frame basis into the two channel signals.

5. A video disc reproducing apparatus according to claim 4, further comprising a memory having recorded therein a control signal indicating a sub-sample phase of a first field of a frame which comes first of a group of two frames of the MUSE signal.

6. A signal recording apparatus according to claim 1, wherein said memory control circuit controls said plural memories to time-expand the plural channel signals when reading the plural channel signals from the plural memories.

7. A video disc recording apparatus according to claim 2, wherein said memory control circuit controls said two memories to time-expand the two channel signals when reading the two channel signals from the two memories.

8. A signal reproducing apparatus according to claim 3, wherein said memory control circuit controls said plural channel memories to time-compress the plural channel signals when reading the plural channel signals from the plural channel memories.

9. A video disc reproducing apparatus according to claim 4, wherein said memory control circuit controls said two channel memories to time-compress the two channel signals when reading the two channel signals from the two channel memories.

* * * * *